May 5, 1936. T. A. COLEMAN Re. 19,959
GAS BURNER
Original Filed Aug. 10, 1933
Fig. 1.
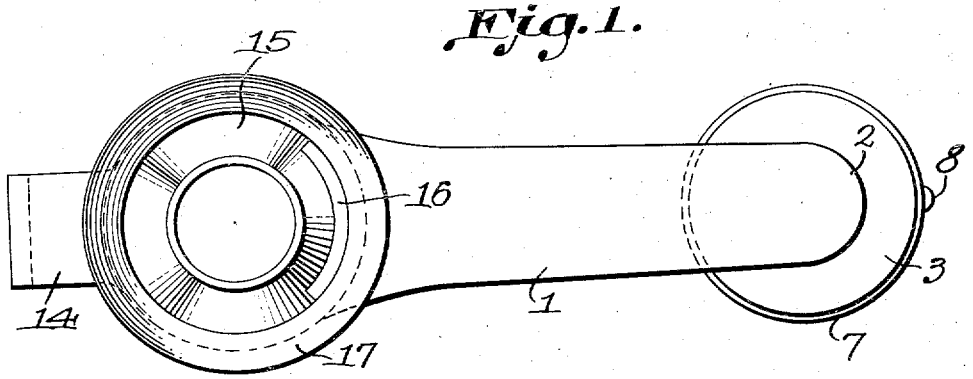
Fig. 2.
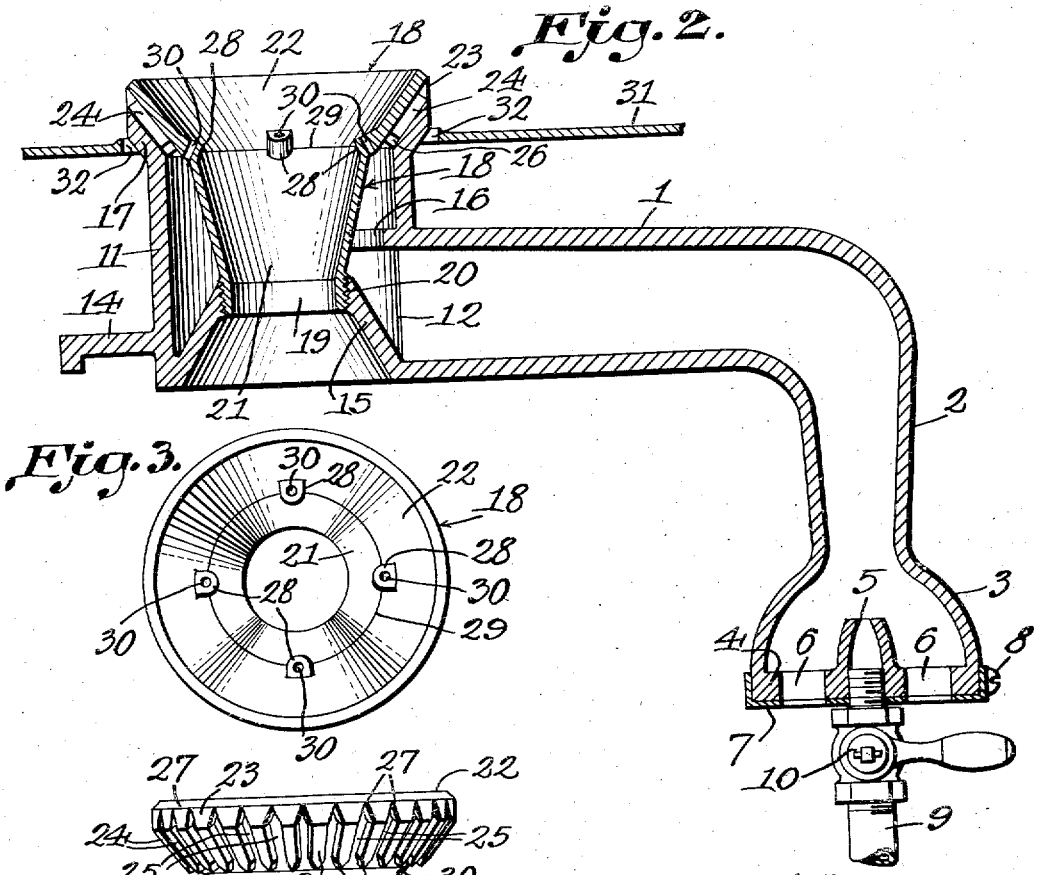
Fig. 3.
Fig. 4.
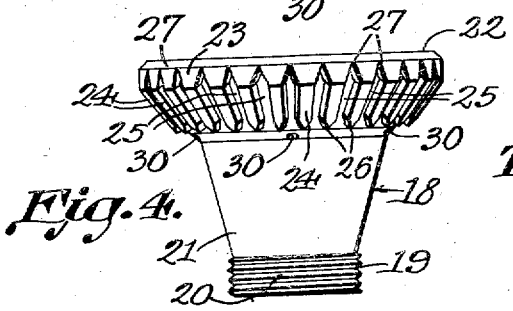
Thomas A. Coleman Inventor
By C. A. Snow & Co. Attorneys.

Reissued May 5, 1936

Re. 19,959

UNITED STATES PATENT OFFICE 19,959

GAS BURNER

Thomas A. Coleman, Carbondale, Pa.

Original No. 1,980,321, dated November 13, 1934, Serial No. 684,584, August 10, 1933. Application for reissue April 3, 1935, Serial No. 14,547

1 Claim. (Cl. 158—116)

The device forming the subject matter of this application is a burner, capable of being employed on cook stoves that use gas, although not confined to that particular structure. The invention aims to provide novel means for delivering the mixture of gas and primary air to the outlets where combustion takes place. Another object of the invention is to improve the rib construction that defines the burner outlet.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 is a top plan of the body of the device;

Fig. 2 is a vertical longitudinal section;

Fig. 3 is a top plan of the tubular inner member;

Fig. 4 is a side elevation of the tubular inner member.

The device is made of any desired metal or metals and includes a tubular body 1. The body 1 is provided at one extremity with a downturned end 2. The end 2 need not be located as shown and described. It can be arranged in any desired manner. On the lower extremity of the part 2 there is an enlarged bell 3 having a bottom 4 in which is mounted an upwardly extended gas nozzle 5 located within the bell 3. The bottom 4 of the bell 3 has air inlets 6 controlled by a valve 7, which may be a rotary, disk-like valve, held at 8, by a screw, or otherwise, on the lower end of the bell 3, for rotary adjustment. The gas enters by way of a pipe 9 having its upper end mounted in the nozzle 5. A valve 10, under the control of an operator, is interposed in the pipe 9.

Formed integrally with the inner end of the body 1 is an enlarged, vertical, tubular casing 11. The inlet that leads from the body 1 to the casing 11 is marked by the numeral 12. Opposite to the body 1, the casing 11 has an outstanding supporting finger 14. An inverted funnel-shaped secondary air inlet 15 is formed integrally with the casing 11, at the lower end thereof, and extends upwardly within the casing 11 to a point a little above the axis of the body 1. The casing 11 has an internal, parti-circumferential rib 16, disposed above the inlet 12, and overhanging the inlet, the rib projecting into the casing 11. The casing 11 terminates in a funnel-shaped, flared top 17.

A tubular inner member 18 is located in the casing 11. The tubular inner member 18 has an annular base 19, threaded at 20 into the secondary air inlet member 15 of the casing 11. The inlet member 18 has an upwardly flared intermediate portion 21 terminating in a flared annular head 22 disposed in the top 17 of the casing 11, in parallel relation thereto. Broad, external, longitudinal, downwardly extended ribs 24 are joined integrally to the head 22 as shown at 23. There are grooves or combustion orifices 25 between the ribs 24. The grooves 25 may be of any desired shape. Preferably they are V-shaped and are of inverted V-shape where they open through the rim of the head 22 of the tubular inner member 18, as shown at 27. The lower ends of the ribs 24 may be pointed, as shown at 26. The ribs 24 engage the top 17 of the casing 11.

The inner tubular member 18 is supplied with internal bosses 28 located at the place 29 where the head 22 joins the intermediate portion 21 of the member 18. In the bosses 28 there are downwardly and outwardly inclined gas inlet ports 30 discharging at their inner ends within the head 22, and communicating, at their outer ends, with the space between the casing 11 and the intermediate portion 21 of the inner member 18.

The numeral 31 marks a stove top or the like, having an opening 32, the wall of which is spaced from the funnel-shaped top 17 of the casing 11.

The general operation of a burner of the kind shown and described is well understood by those skilled in the art. The gas enters the body 1 by way of the pipe 9 and the nozzle 5, under the governance of the valve 10. The valve 7 regulates the primary supply of air through the inlets 6. The mixture of gas and primary air proceeds to the inlet 12, and here enters the space between the inner member 18 and the casing 11. At this point an important operation takes place. The member 15, being funnel-shaped, or cone-shaped tends to direct the mixture of gas and primary air upwardly, but the rib 16 prevents the mixture from flowing upwardly, in too great a measure, directly through the grooves 25 that are immediately above the inlet 12. The result is that the primary mixture of gas and air is distributed fairly and evenly to all of the grooves 25, and this is especially true, in view of the fact that the intermediate portion 21 of the inner member 18 has an outward and upward flare. The delivery of the mixture of primary air and gas, through the grooves 25, is facilitated because the ribs 24 are pointed to a V-shaped edge throughout an area restricted to their lower ends, as shown at 26, and a fine and even distribution is effected because the grooves 25 are pointed at their upper ends, as shown at 27, where the said grooves open through the rim of the part 22. The gas and primary air are admitted between the casing 11 and the inner member 18, for engagement with the pointed lower ends 26 of the ribs 24, for passage through the grooves 25, and for exit through the inverted V-shaped portions 27 of the grooves. The specific construction of the grooves alluded to is highly useful, but it is not insisted upon.

The purpose of the gas ports 30 in the member 18 is to make the burner flame impinge on the middle part of the cooking utensil (not shown) which is above the burner. The secondary air, delivered through the inlet 15 and the member 18, keeps the member 18 cool and at the same time, the cooking utensil is heated evenly and thoroughly. There is an upward flow of air through the opening 32, in the general direction of the flame.

The grooves 25 are spaced apart to permit secondary air to circulate through the flame, which is an advantageous feature in the burner, since it aids combustion.

Having thus described the invention, what is claimed is:

In a device of the class described, a tubular body provided at one end with controlled means for the admission of gas and primary air, the body being provided at its opposite end with an enlarged tubular casing arranged approximately at right angles to the body, there being an inlet where the body and the casing are joined together, the casing having a flared top and having an inverted funnel-shaped secondary air inlet member at its lower end, located within the casing and in the path of the mixture of gas and primary air entering the casing by way of the first-specified inlet; and a tubular inner member in the casing and having its lower end mounted on the upper end of the secondary air inlet member, said tubular inner member including an upwardly flared intermediate portion and an upwardly flared top, there being ribs between the top of the inner member and the flared top of the casing and forming combustion orifices, the casing being provided with an imperforate part-circumferential internal rib located directly above the first-specified inlet and projecting toward the intermediate portion of the tubular inner member, the internal rib overhanging a portion of the funnel-shaped secondary air inlet member, the internal rib being located between the first-specified inlet and the combustion orifices that are immediately above said inlet, all portions of said internal rib being disposed approximately at right angles to the axis of the funnel-shaped air inlet member.

THOMAS A. COLEMAN.